July 14, 1931.  J. A. RUTTER  1,814,858
LOCKING DEVICE FOR BOLTS
Filed Oct. 18, 1928
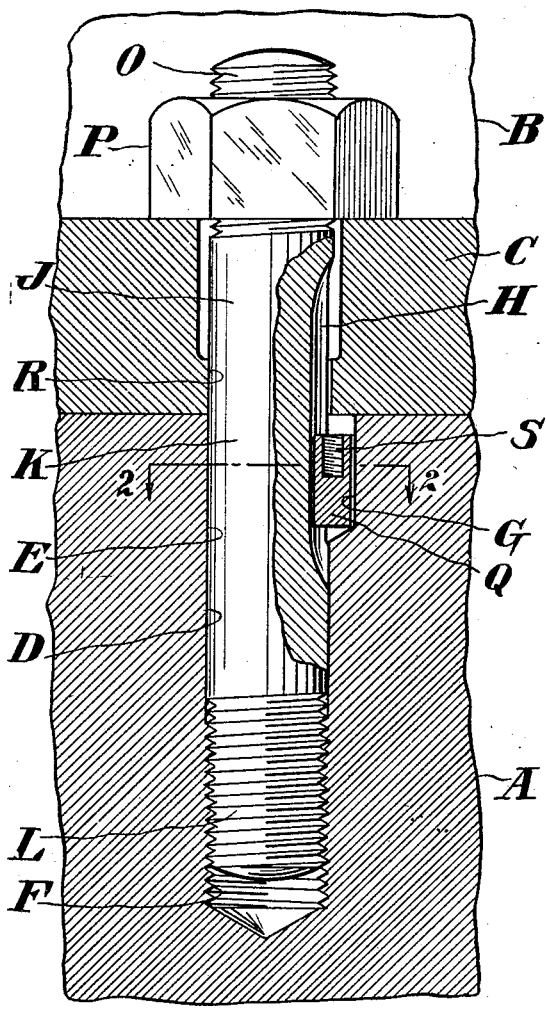
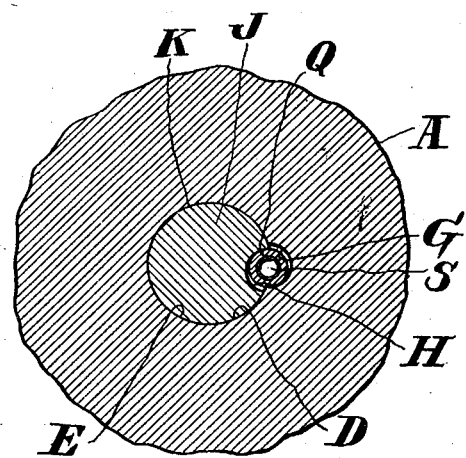
FIG.-1.
FIG.-2.
INVENTOR.
John A. Rutter
BY
HIS ATTORNEY.

Patented July 14, 1931

1,814,858

UNITED STATES PATENT OFFICE

JOHN A. RUTTER, OF PHILLIPSBURG, NEW JERSEY, ASSIGNOR TO INGERSOLL-RAND COMPANY, OF JERSEY CITY, NEW JERSEY, A CORPORATION OF NEW JERSEY

LOCKING DEVICE FOR BOLTS

Application filed October 18, 1928. Serial No. 313,264.

This invention relates to locking devices, but more particularly to a locking device for stud bolts used for clamping an element or elements between the nut of the bolt and the support into which the bolt is threaded.

One object of the invention is to prevent rotation of the bolt with the nut during the threading of the nut on the bolt.

Another object is to eliminate the expense of effecting a tight fit between the bolt and the tap hole and thus also obviate the consequent delay in threading the bolt into its support.

Other objects will be in part obvious and in part pointed out hereinafter.

In the drawings illustrating the invention and in which similar reference characters refer to similar parts, Figure 1 is a sectional elevation of a stud bolt utilized for clamping a plurality of elements together and illustrating the manner in which the bolt is locked against unauthorized rotation, and Figure 2 is a transverse view taken through Figure 1 on the line 2—2 looking in the direction indicated by the arrows.

Referring to the drawings, A designates a support, such as the base plate of a machine, and B the superstructure or frame of the machine having a flange C which it is intended to clamp to the support A.

In securing a plurality of elements together, such as those described, it is customary to employ stud bolts, particularly where it becomes necessary to at times remove the frame from the support. One reason for resorting to the use of this type of bolt is that it has been found practically impossible to frequently remove a bolt from its support without injuring the threads of the hole into which the bolt is threaded. The repeated removal of the bolt will cause the threads to become worn thus destroying the original binding fit between the bolt and the support.

Usually the tapped holes in the support are threaded from the outer opening and the threaded portion of the bolt which fits into the tapped hole is somewhat longer than the depth of the hole so that the end of the bolt may bear against the bottom of the hole. In this form of construction it is essential that a nice fit be effected between the threads of the bolt and those of the tapped hole into which the bolt is disposed. This may be brought about by using a tap of slightly smaller diameter than the nominal size so that in threading the bolt into the tap hole the material forming the threads in the tap hole will be forced into the bottom of the threads in the bolt and thus create a binding effect.

The foregoing is the result generally sought but is very frequently impossible of attaining and, as a result, a great number of bolts are found to be provided with threads which are incapable of displacing the material of the threads in the tap hole in the manner described. The result is a loose fit and whenever it is desired to remove the nut the bolt readily becomes unthreaded from the element into which it is seated. The present invention is intended to eliminate this undesirable occurrence and to this end the support A is provided with an aperture D having an outer cylindrical portion E and an inner threaded portion F. The portions E and F may of course be of any desired or required length and at the opening of the aperture and in the cylindrical portion E is formed a longitudinal groove G adapted to register with a similar groove H in the bolt J threaded into the aperture D.

The bolt may have the usual intermediate smooth cylindrical portion K and preferably it is into this portion that the groove H is formed. The ends L and O of the bolt are of course threaded, the end L extending into the threaded portion F of the aperture and the end O extending above the flange C to receive a nut P whereby the frame B is clamped to the support A.

The groove H is preferably of such length that a considerable portion thereof lies above or outside of the support A so that a key Q inserted in the grooves G and H for preventing rotation of the bolt J with the nut P may be readily inserted into the grooves G and H.

As will be observed the present construction eliminates the necessity of threading the bolt against great resistance through the threaded portion F of the support in order to force the end of the bolt against the bottom of the aperture D. In practice it is merely necessary to thread the bolt J a suitable distance into the threaded portion F of the aperture and then bring the groove H into registry with the groove G. The key Q may then be inserted in the grooves and the bolt J be given an additional slight turn so that the key Q, which is preferably of smaller diameter than the opening formed by the grooves G and H, will be pressed or clamped between opposed sides of the grooves G and H in the manner illustrated in Figure 2. Ordinarily however, the aperture R in the flange C through which the bolt J extends is of such diameter that the material of the flange will overlie the groove G and retain the key Q in the grooves. If desired the key Q may be provided with a threaded aperture S for the reception of a screw or other threaded implement for withdrawing the key from the grooves G and H.

In the form of the construction shown the grooves G and H as well as the key Q are of generally cylindrical form. This is considered desirable since it eliminates the formation of sharp corners in the bolts and which when used in bolts subjected to great strains frequently result in breakage of the bolts at this point.

This invention has been found to be highly desirable for use in the manner and in connection with such elements as those described. Foremost of these advantages is the elimination of the necessity of obtaining a tight fit between the threads of the bolt and the aperture into which the bolt is threaded. The bolt is therefore not subjected to the terrific strains in seating it in the support and it is not necessary to form other than standard threads on the bolt and the support.

I claim:

In a locking device for stud bolts, the combination of a support having a recess, a groove in the support opening into the recess and extending longitudinally thereof, a stud bolt in the recess having a groove to register with the first groove, a key in the grooves preventing the bolt from being rotated and removed from the recess, and a threaded aperture in the key adapted to receive withdrawing means to remove the key from the grooves.

In testimony whereof I have signed this specification.

JOHN A. RUTTER.